United States Patent
Liao et al.

(10) Patent No.: US 7,814,540 B1
(45) Date of Patent: Oct. 12, 2010

(54) SYSTEMS AND METHODS FOR IMPLEMENTING SOURCE TRANSPARENT EMAIL GATEWAYS

(75) Inventors: En-Yi Liao, Cupertino, CA (US); Cheng-Lin Hou, Cupertino, CA (US); Jerry Chinghsien Liao, Cupertino, CA (US)

(73) Assignee: Trend Micro Inc., Cupertino, CA (US)

( * ) Notice: Subject to any disclaimer, the term of this patent is extended or adjusted under 35 U.S.C. 154(b) by 1327 days.

(21) Appl. No.: 11/318,361

(22) Filed: Dec. 23, 2005

(51) Int. Cl.
*G06F 9/00* (2006.01)
*G06F 15/16* (2006.01)
*G06F 17/00* (2006.01)

(52) U.S. Cl. ............................. 726/12; 726/2; 713/153
(58) Field of Classification Search ............... 726/12; 723/153
See application file for complete search history.

(56) References Cited

U.S. PATENT DOCUMENTS

| 6,098,172 A * | 8/2000 | Coss et al. ............... 726/11 |
| 2002/0004899 A1 * | 1/2002 | Azuma ..................... 713/152 |
| 2005/0120229 A1 * | 6/2005 | Lahti ........................ 713/188 |
| 2006/0156379 A1 * | 7/2006 | Vissapragada ............... 726/1 |

* cited by examiner

*Primary Examiner*—Kimyen Vu
*Assistant Examiner*—Yogesh Paliwal
(74) *Attorney, Agent, or Firm*—IP Strategy Group, P.C.

(57) ABSTRACT

Methods and arrangements for implementing new email handling policies in gateway logic that is inserted upstream of the existing email system (which may or may not have an existing email gateway). By inserting the gateway logic upstream of the existing email system, it is unnecessary to reconfigure existing email handling logic since the remainder of the email system downstream of the newly inserted gateway logic is substantially undisturbed. Techniques and arrangements are proposed to ensure the remainder of the email system continues to function correctly after the insertion of the new gateway logic.

23 Claims, 8 Drawing Sheets

SYSTEMS AND METHODS FOR IMPLEMENTING SOURCE TRANSPARENT EMAIL GATEWAYS

BACKGROUND OF THE INVENTION

Emails have become a ubiquitous communication tool for business and individuals alike. As the popularity of emailing increases, the volume and variety of emails received by an entity (such as a business or an individual) correspondingly increase. To assist the recipient, email systems nowadays may employ email handling policies to automate the handling of incoming emails. For example, incoming emails may be inspected in accordance with implemented email handling policies to filter out undesirable traffic (such as spam), to remove virus, and/or to identify certain emails for special handling, etc.

Complex email handling policies may be implemented using one or more email gateways. Each gateway encodes a set of business logic for handling the incoming emails. For certain email systems, the email handling policies may be quite complex, requiring a substantial amount of effort to setup, debug, and maintain the software, hardware, and business logic configurations and settings. Once the email handling policies are set up, email administrators are often reluctant to make changes to the implemented email handling policies.

However, as email systems and the emails themselves evolve, existing email handling policies need to be updated and/or supplemented from time to time. The deployment of new email handling polices ensure, for example, that a newly discovered email threat is properly screened before such threat can wreak havoc on the recipient's computer system. If email administrators are reluctant to deploy new email handling policies and features because of the risk and/or the substantial amount of work involved in integrating new email handling policies and features into the existing gateway infrastructure, or in migrating existing email handling polices onto a new gateway infrastructure, the integrity of the email system may be compromised and/or the functionality of the email system may be unnecessarily limited over time.

To encourage the adoption of new email handling policies and features, methods and arrangements are proposed herein to facilitate the deployment of new email handling policies and features without requiring a substantial amount of work to reconfigure the existing email handling policies and/or existing email gateway infrastructure.

SUMMARY OF INVENTION

The invention relates, in an embodiment, to a method for implementing a first set of email handling policies in an email system that implements a set of existing email handling policies in an existing email policy handling logic. The method includes interposing gateway logic upstream of the existing email policy handling logic such that the gateway logic is interposed between an external network and the existing email policy handling logic. The gateway logic is configured to receive an email from the external network after the interposing, wherein the existing email policy handling logic receives the email from the external network prior to the interposing. The method further includes performing the first set of email handling policies using the gateway logic. The method further includes relaying, using the gateway logic, a source IP address associated with the email from the gateway logic to the existing email policy handling logic, thereby rendering the source IP address of the email available to the existing email policy handling logic and enabling the existing email policy handling logic to perform at least a portion of the set of existing email handling policies using the source IP address.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that include a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

To fully explain the invention, some discussion of email gateway technology may be useful. It is noted by the inventors herein that in any given email system, the internet-facing email gateway (i.e., the first email hop that receives the email from the internet if there exists a set of email hops between the final email server and the internet email client) often requires the source information in order to perform its email handling logic. Once the internet-facing email gateway completes the execution of its email handling logic, it may pass the received email on to the remainder of the email system, which includes the final email server.

In some email systems, there may exist additional email gateways in the remainder of the email system (i.e., downstream of the internet-facing email gateway or disposed in between the internet-facing email gateway and the final email server) for implementing other email handling logic. Irrespective, the original source information, which includes the source IP address and the port number of the email client that sends out the original email, is not passed on by the internet-facing email gateway to the remainder of the email system. Instead, the email that is passed on is identified by the IP address and port number of the sender, which is the internet-facing email gateway in this case.

Figure 1:
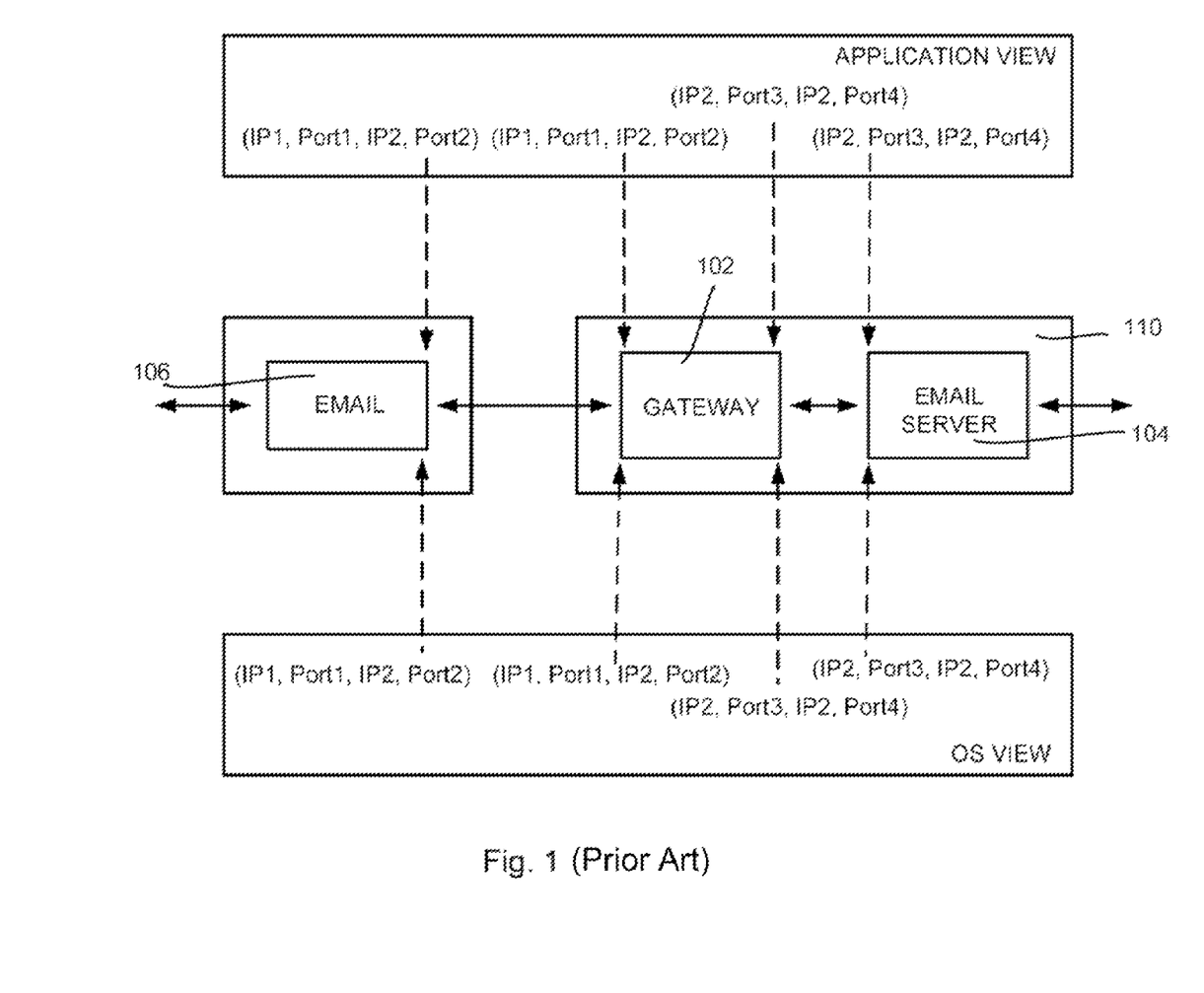
FIG. 1 shows a simple prior art email system, including an email client, an email gateway, and an email server.

The situation is depicted in FIG. 1. In the example of prior art FIG. 1, there is shown only a single email gateway 102, which is implemented on the same hardware box 110 as an email server 104. In reality, any number of additional email gateways may exist between email gateway 102 and email server 104. Email gateway 102 represents the internet-facing email gateway and receives, via the network, the incoming email from an email client 106. As is typically the case, the email is sent via a socket connection established between email client 106 and email gateway 102 via the network (such as the internet, not shown in FIG. 1).

The connection between email client 106 and internet-facing email gateway 102 is represented by a four-tuple notion (IP1, Port 1, IP2, Port 2), representing the fact that the email with source IP address IP1 is sent from Port 1 to the destination address IP2 and received via Port 2. After email gateway 102 executes its email handling policies, email gateway 102 may (if the conditions of the policies are satisfied) pass the received email on to email server 104.

The connection between email gateway 102 and email server 104 is represented by a four-tuple notion (IP2, Port 3, IP2, Port 4), representing the fact that the email that is passed on has the source IP address associated with the box implementing email gateway 102 (i.e., IP2) and is sent from Port 3. Since both email gateway 102 and email server 104 are implemented in the same hardware box in the present example, the receiving email server has the same IP address, IP2. The port employed to receive the email sent from email gateway 102 is Port 4. These IP addresses and Port numbers are identically seen by applications executing on hardware 110 and the operating system (OS) of hardware 110.

As can be seen, email gateway 102 receives the source information (IP1, Port 1). However, this source information is not passed on to the remainder of the email system. The email that is passed on has the source IP address of the sender (e.g., email gateway 102 when email gateway 102 sends the email from email gateway 102 to email server 104). Accordingly, if email gateway 102 employs the source information to perform its email handling logic, as is often the case, it is not possible to insert another upstream email gateway in front of email gateway 102 (e.g., between email gateway 102 and email client 106) to implement supplemental email handling logic since such insertion would prevent email gateway 102 from receiving the source information (e.g., IP1, Port 1).

Figure 2:
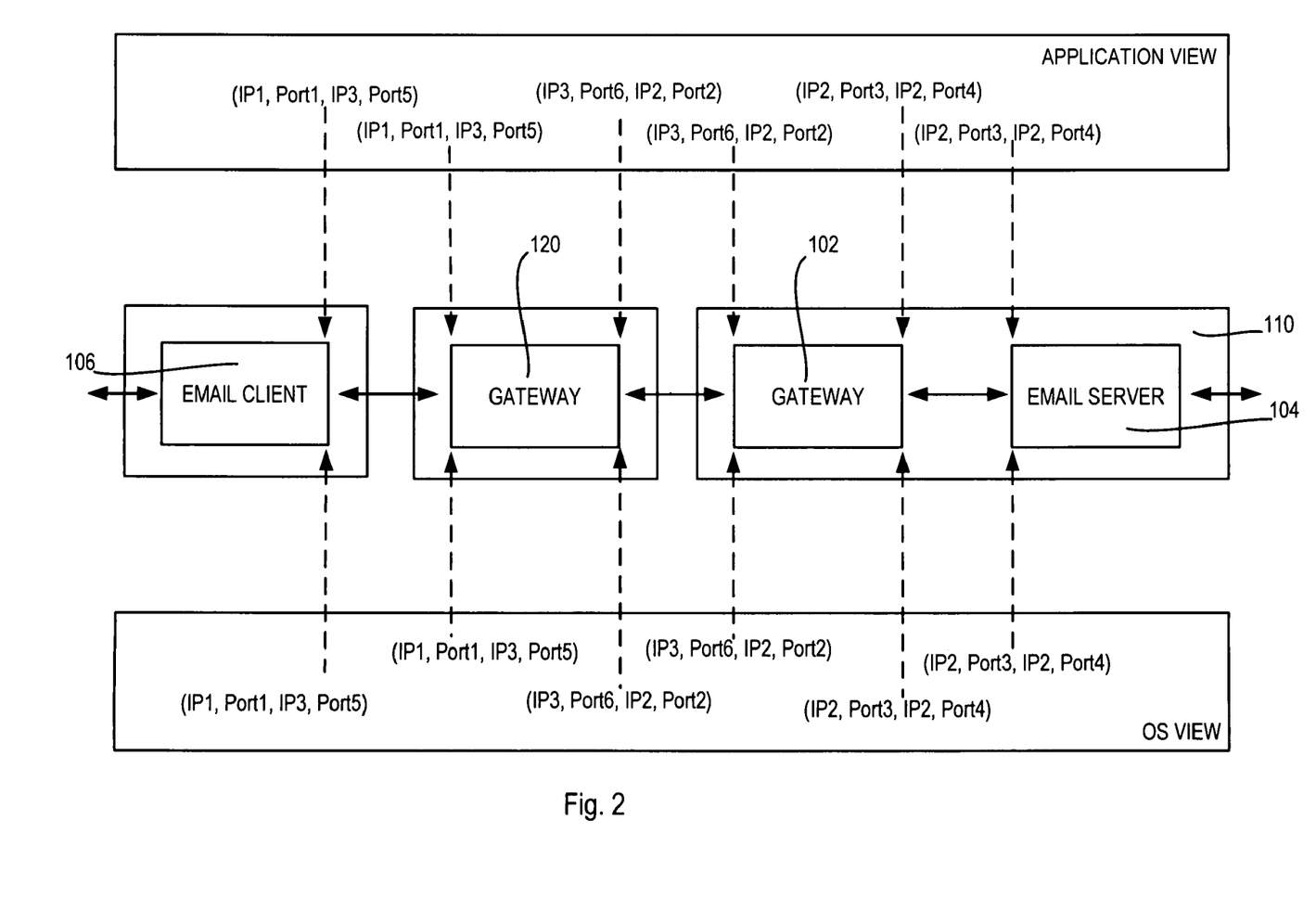
FIG. 2 shows the email system of FIG. 1 with an additional email gateway inserted into the internet-facing position to facilitate discussion of the problems encountered.

Instead, such an insertion, if handled in the conventional manner, would result in emails received by email gateway 102 from the newly inserted email gateway having the source IP address of the newly inserted sending email gateway and the outgoing port number of the newly inserted sending email gateway. Without the original source information (e.g., IP1, Port 1), existing email gateway 102 may not be able to execute its business logic correctly. This situation is depicted in FIG. 2 in which the insertion of email gateway 120 causes existing email gateway 102 to receive emails having source address IP3, and outgoing port identifier Port 6 instead of the expected original source information (IP1, Port 1).

In accordance with embodiments of the present invention, there are provided methods and arrangements for implementing new email handling policies in a gateway logic that is inserted upstream of the existing email system (which may or may not have an existing email gateway). By inserting the gateway logic upstream of the existing email system, it is unnecessary to reconfigure existing email handling logic since the remainder of the email system downstream of the newly inserted gateway logic is substantially undisturbed. However, to ensure that the existing email handling logic continues to operate as intended, methods and arrangements are provided with some embodiments to enable the existing internet-facing email gateway (e.g., email gateway 102 in FIG. 2) to continue to receive the original source information (e.g., IP1, Port 1 in the previous example). This is despite the fact that with the insertion of the new email gateway (e.g., email gateway 120) implementing the additional email handling logic, emails are first received and processed by the newly inserted email gateway before being passed on to the existing email gateway that was facing the network prior to the insertion of the new email gateway.

In an embodiment, the newly inserted gateway transparently passes the original source information received from the email client to the downstream existing email gateway. From the application standpoint, email handling applications in the existing gateway continue to receive emails having the source information associated with the sending email client instead of the source information associated with the newly inserted email gateway. Note that this is different from the expected behavior of a conventional email gateway chain since, as discussed above, an email gateway in the middle of a conventional gateway chain (such as email gateway 102 in the example of FIG. 2) only sees the source information associated with the upstream email gateway (such as IP3, Port 6 in the example of FIG. 2) and not the original source information (e.g., IP1, Port 1) that the upstream, internet-facing email gateway sees.

Figure 3:
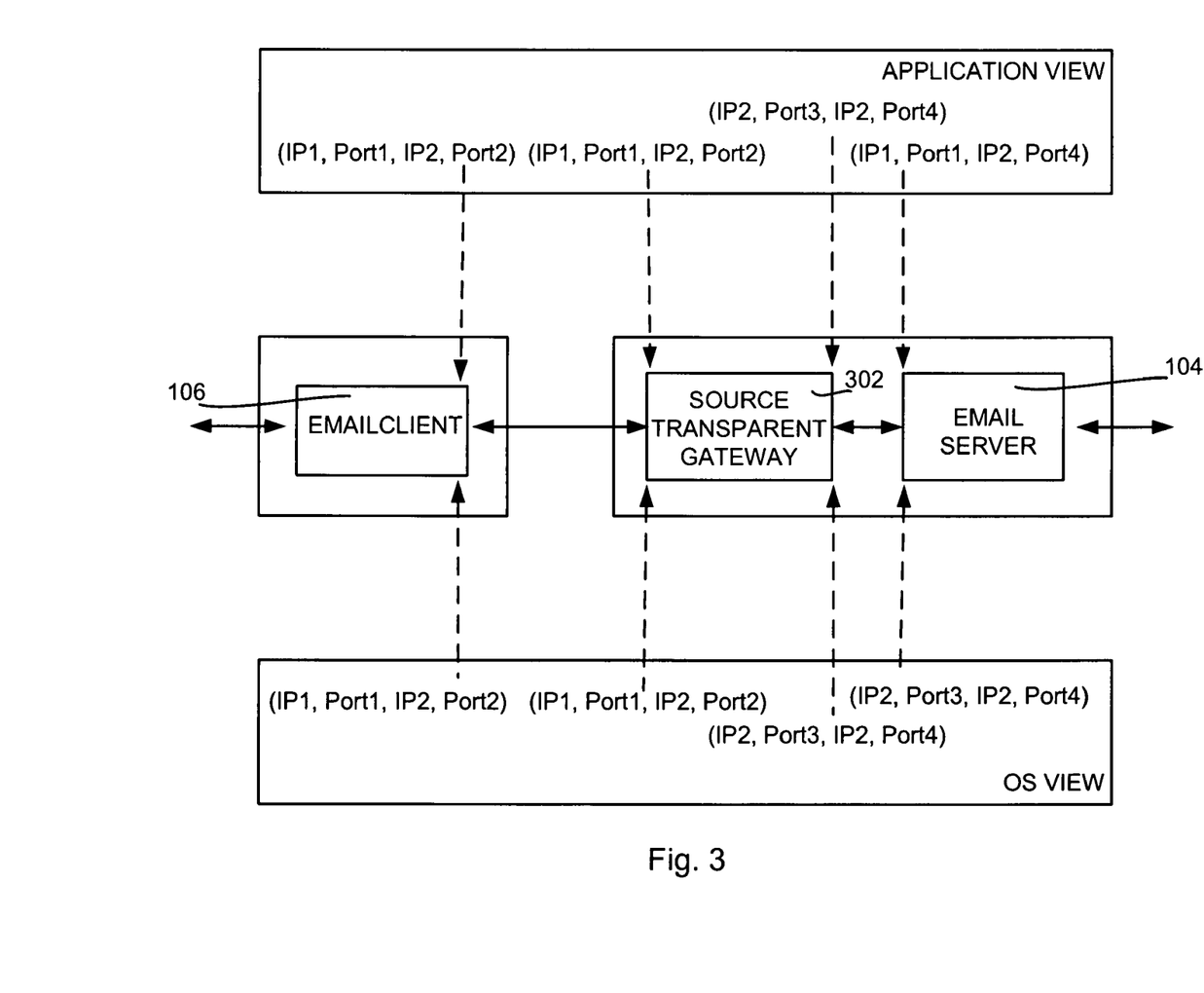
FIG. 3 depicts, in accordance with an embodiment of the invention, a transparent email gateway inserted into the existing email system of FIG. 1.

FIG. 3 depicts, in accordance with an embodiment of the invention, a transparent gateway 302 inserted into the existing email system of FIG. 1. In the case of FIG. 3, transparent gateway 302 implements not only new email handling logic but also logic to enable the remainder of the email system, including email gateway 102, to continue to correctly execute existing email handling policies. In contrast with the arrangement of FIG. 2, newly inserted email gateway 302 not only implements the additional email handling logic therein but also passes the original source information associated with the email sent (such as IP1, Port 1 in the examples herein) to email handling applications executing on its downstream email server 104 (or to any other existing email gateway if such existing email gateway is present). With the original source email address available to its email handling applications, these existing email handling applications may continue to operate as expected after the email handling logic implemented in newly inserted email gateway 302 has been executed. In other words, upstream email gateway 302 is substantially transparent to the email handling applications in downstream email server 104. In this manner, downstream email server 104 may continue to handle incoming emails as if email gateway 302 were not present.

Although the example of FIG. 3 depicts the implementation of a transparent email gateway that is installed as software in the same hardware box as the existing downstream email server, it is also possible to implement the transparent gateway in a different hardware box (which allows the transparent email gateway to have a different IP address from the IP address of the existing downstream email gateway).

Figure 4:
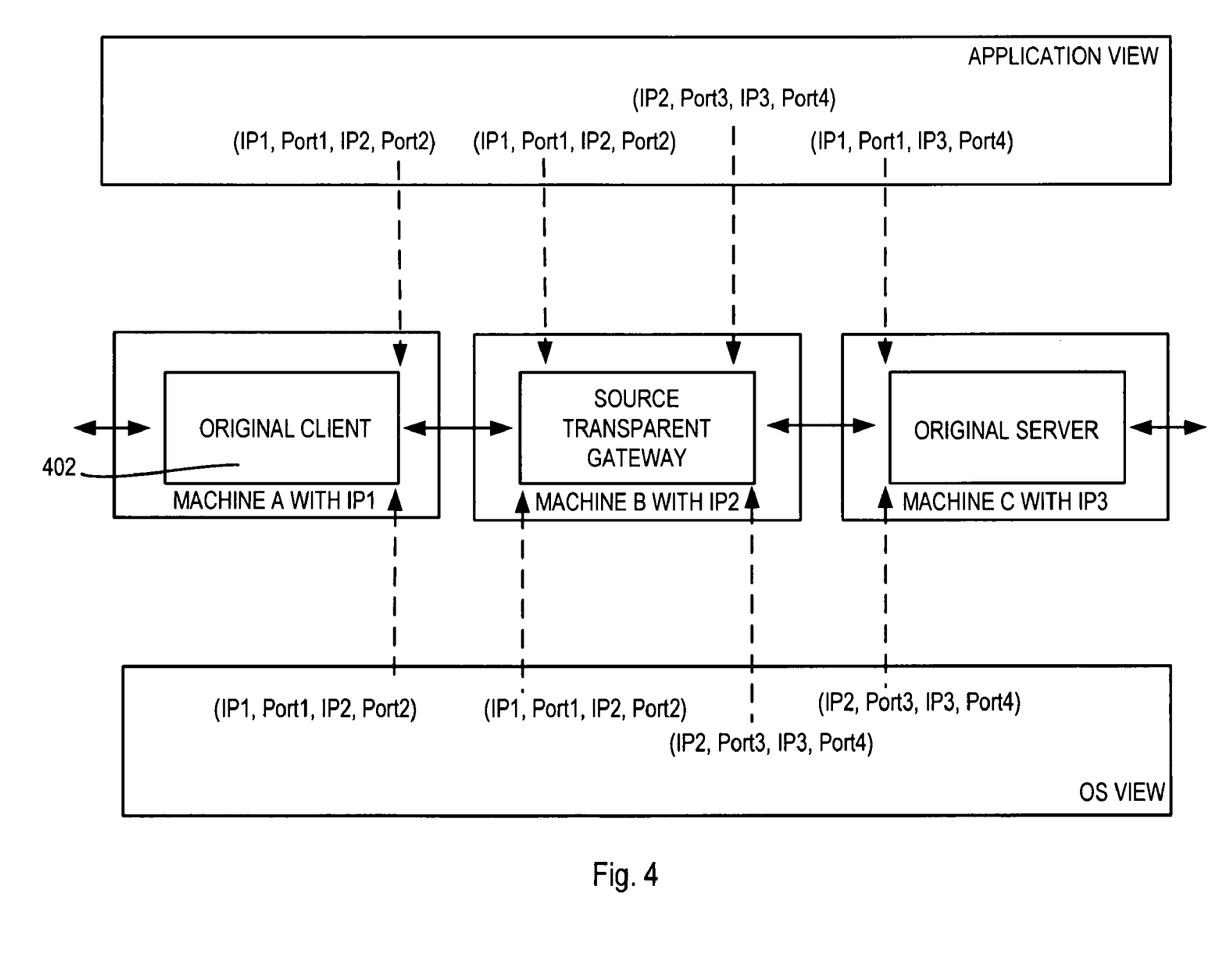
FIG. 4 depicts an embodiment wherein the transparent email gateway is implemented in a different hardware box.

FIG. 4 depicts this embodiment wherein the transparent gateway is implemented in a different hardware box. Further, the other email gateways may be implemented in the same or in a different hardware box from the receiving email server. The email gateways themselves, including the source transparent email gateway, may be implemented on individual hardware boxes, on a set of hardware boxes with some of the gateways co-locating in the same hardware box, or all on a single hardware box. In this disclosure, a hardware box or server refers to a hardware unit that has its own IP address.

Figure 5:
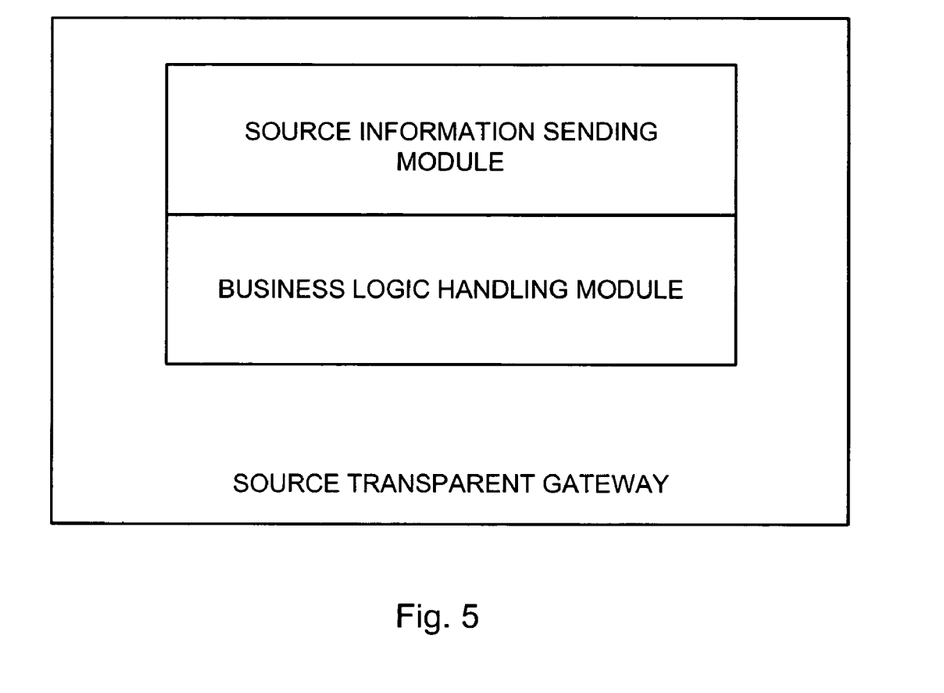
FIG. 5 shows an example transparent email gateway, in accordance with an embodiment of the invention.

FIG. 5 shows an example transparent email gateway, in accordance with an embodiment of the invention. In an embodiment, the transparent email gateway logic is implemented by software code in the email gateway and in the existing downstream gateway logic that is the immediate next hop in the gateway chain. Code in the transparent email gateway is responsible for, among other possible tasks, accepting the socket connection from the sending email client via the network (e.g., the interne), keeping records of the original source information (e.g., IP1, Port 1 in the examples herein), sending the original source information to the next downstream hop in the email system (e.g., to existing downstream email gateway 102 or to the receiving email server if there are no email gateways between the transparent email gateway and the receiving email server), and executing its own email handling logic.

Figure 6:
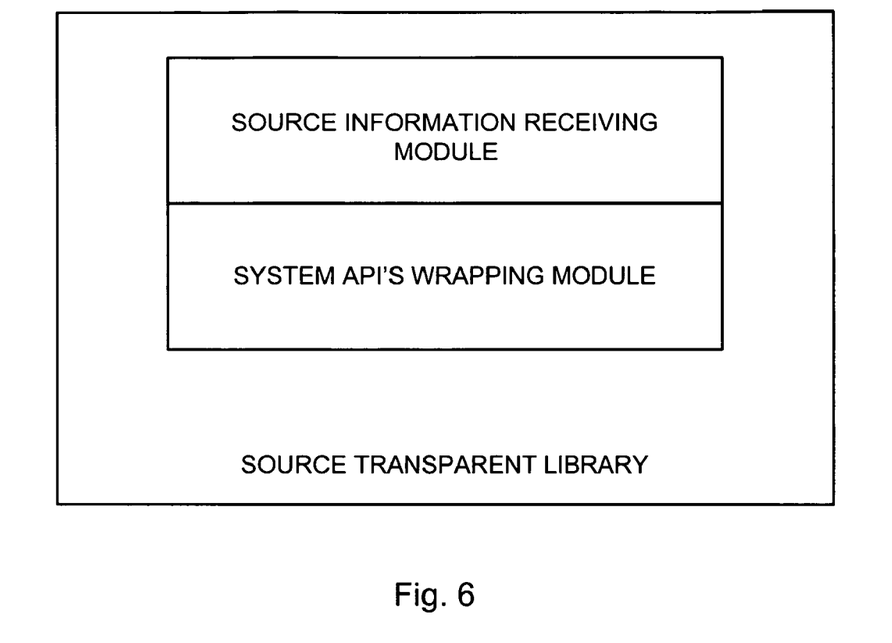
FIG. 6 shows an example of the source transparent library, representing an implementation of the code implemented in the existing downstream email gateway to enable the transparent email gateway capability.

FIG. 6 shows an example of the source transparent library, representing an implementation of the code implemented on the computer of the existing downstream email gateway to enable the transparent email gateway capability. Source transparent library in the existing email gateway is responsible for, among other possible tasks, receiving the original source information from the transparent email gateway, intercepting certain API calls or system calls used by applications, returning the original source information to the calling application(s) so that the calling applications can execute correctly using the original source information.

Figure 7:
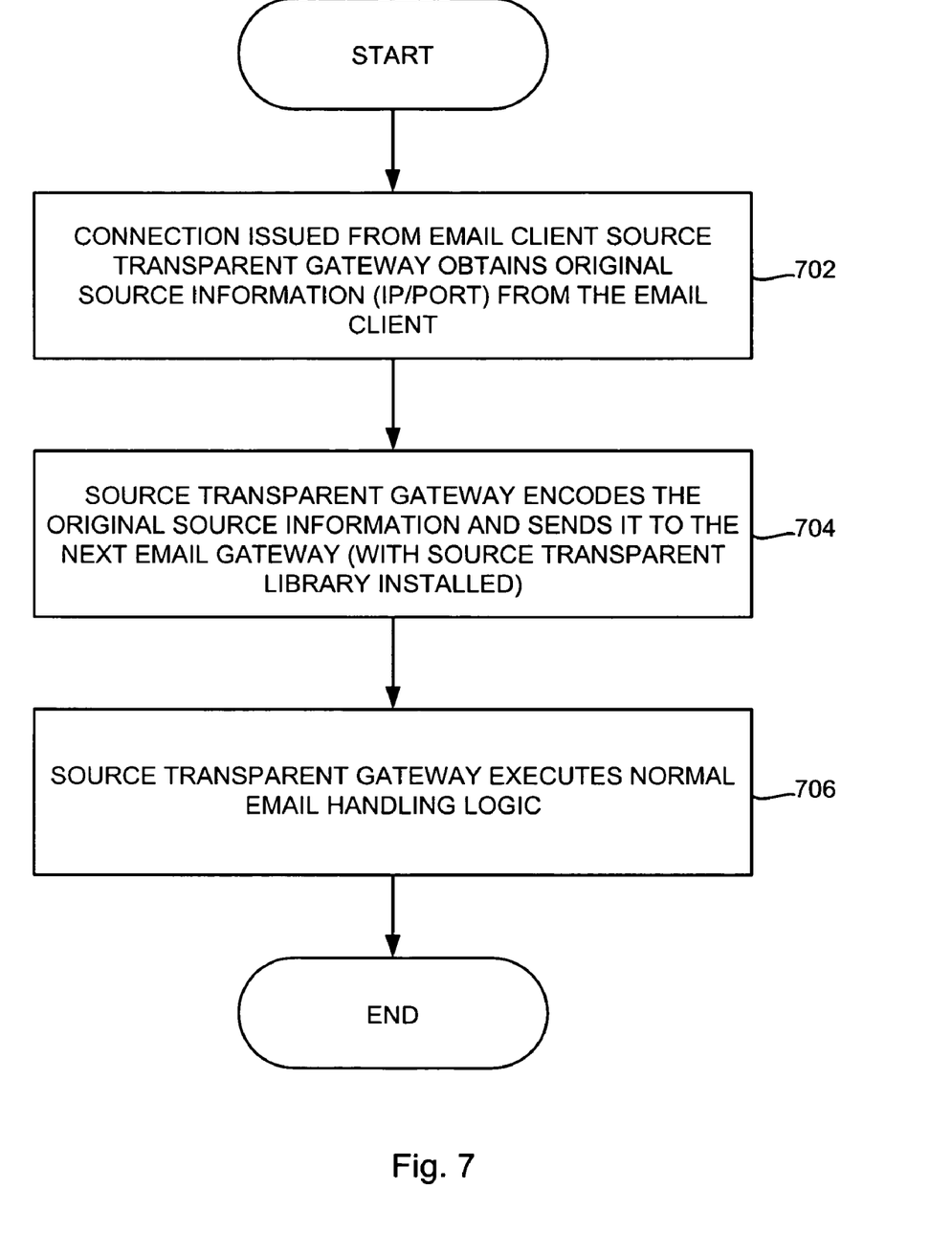
FIG. 7 shows, in accordance with an embodiment of the invention, a flow chart of the steps involving the transparent email gateway during the handling of incoming emails.

FIG. 7 shows, in accordance with an embodiment of the invention, a flow chart of the steps involving the transparent email gateway during the handling of incoming emails. In step 702, the sending email client and the source transparent gateway establish a socket connection. Also, the source transparent gateway obtains the original source information, including the IP address of the sending email client and the outgoing port employed to send out the email. In step 704, the source transparent gateway encodes the original source information and sends the encoded original source information to the source transparent library in the existing email gateway for storing in a data structure therein. The encoding may employ any suitable protocol. In an embodiment, the original source information is encoded using the same protocol as that employed to relay the email, e.g., SMTP or Simple Mail Transfer Protocol, to take advantage of the existing protocol handling infrastructure in the existing email gateway.

In step 706, the source transparent gateway executes its email handling logic, which may include service level email handling (such as anti-virus, anti-spam, filtering based on content, sender identity, etc.).

Figure 8:
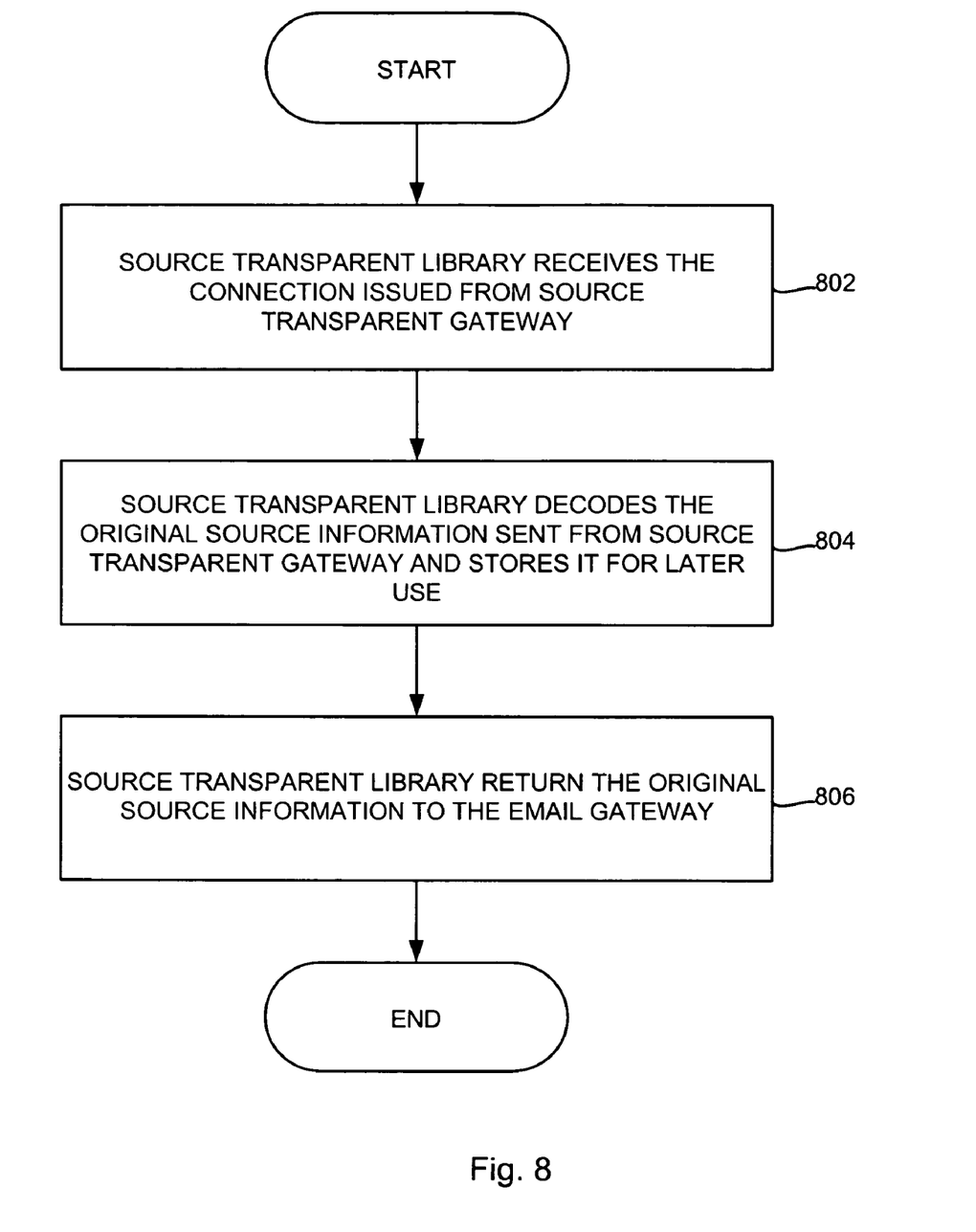
FIG. 8 shows, in accordance with an embodiment of the invention, a flow chart of the steps involving the source transparent library.

FIG. 8 shows, in accordance with an embodiment of the invention, a flow chart of the steps involving the source transparent library. In step 802, the source transparent library in the existing email gateway receives the original source information passed from source transparent gateway. In step 804, source transparent library decodes the original source information and stores it for later use. In step 806, source transparent library intercepts API (Application Programming Interface) calls and system calls that involve the source information of the received email and returns the stored original source information to the calling function instead of returning the source information known to the operating system of the existing email gateway, i.e., the IP address and outgoing port identifier associated with the relaying transparent email gateway.

UNIX Implementation Example.

Although the following example discusses a UNIX implementation of the transparent email gateway, it should be kept in mind that the invention is not limited to any particular platform such as UNIX™, LINUX™, SOLARIS™, WINDOWS™, or APPLE™. When an email is sent from the sending email client, a socket connection is first established between the sending email client and the transparent email gateway via the network. The establishment of this socket connection informs the transparent email gateway of the source IP address and the outgoing port of the email.

After the socket connection is made, the transparent email gateway establishes a socket connection to the downstream email gateway (or to the receiving email server if there are no other email gateways in between). Once the socket connection is established between the transparent email gateway and the downstream email gateway, the source transparent gateway encodes the original source information and transmits the encoded original source information to the source transparent library in the downstream email gateway. Thereafter, incoming email traffic may be passed from the sending email client to the source transparent gateway to the downstream email gateway. Each of the gateways in the chain may execute its own email handling logic.

The source transparent library may be implemented as a dynamic link library and may be configured to intercept certain system calls that involve the incoming email such as accept( ), getpeername( ), close( ), etc., in order to return to the caller the original source information. accept( ) represents the system call that accepts the request to establish a socket connection issued by the transparent gateway. getpeername( ) represents the system call to obtain information about an incoming socket connection. close( ) represents the system call to close a socket connection and to release resources formerly allocated to that socket connection.

Consider the case of the system call accept( ), for example. In this case, right after the system call accept( ) is invoked by an application associated with the existing email gateway, the accept( ) call is received by the source transparent library. The source transparent library delegates the handling of the accept( ) call to existing accept( ) call handling infrastructure. After the accept( ) call returns successfully, code in the source transparent library fetches the encoded original source information (e.g., IP1, Port 1 in our examples), decodes the encoded information, and stores the original source information in a data structure for later use. Thereafter, the original source information is packed into a parameter carried by the accept( ) call and return.

If the existing email gateway issues a getpeername( ) to obtain peer information of the peer that have established socket connections with the existing email gateway, the system call getpeername( ) is intercepted by the source transparent library. The source transparent library then tries to find the file descriptor passed as the first parameter from the internal data structure. If it is found in the internal data structure, the stored original source information is returned in response to the issued getpeername( ). If not, the getpeername( ) functions as conventional, i.e., obtaining and returning the peer information with which the existing email gateway has a socket connection.

Other calls are handled in an analogous manner.

The source transparent library may be implemented in the existing email gateway by configuring the dynamic loader in the existing email gateway to load the source transparent library prior to loading other existing libraries. For example, the instruction LD_PRELOAD may be employed. By preloading the source transparent library, the existing libraries do not have to be modified to implement the source transparent library functionality. The source transparent library functionality may also be achieved by modifying existing libraries or by modifying the run-time process of the existing email gateway to ensure that certain system calls are passed to the source transparent library for handling. For example, the instruction ptrace( ) may be employed.

Although the invention may be implemented with a dynamic linked library, other approaches are also feasible. Examples of alternative approaches include, for example, using a device driver, a replacement library that replaces the original Winsock library, a source module that is modified from open source, etc. As long as the source information can be acquired from the source transparent gateway and relayed to the existing email logic, any of the above approaches and others can be employed.

As can be appreciated from the foregoing, embodiments of the invention enable the efficient implementation of new email handling policies in a gateway logic that is inserted upstream of the existing email system while allowing email gateways in the existing email system to function as if the newly inserted gateway logic is transparent. As such, it is unnecessary to reconfigure existing email handling logic since the remainder of the email system downstream of the newly inserted gateway logic is substantially undisturbed. Thus, new policies can be efficiently implemented without undue time delay and without having to undertake extensive re-configuration of the existing email gateway infrastructure.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for implementing a first set of email handling policies in an email system that implements a set of existing email handling policies in an existing email policy handling logic, said method comprising:

obtaining, using gateway logic, source information related to an email, said email being sent by an email client, said source information including an Internet Protocol address (IP address) of said email client, said source information further including a port identifier of a port of said email client, said pen of said email client being-employed to send out said email said gateway logic being interposed between an external network and said existing email policy handling logic, encoding, using said gateway logic, said source information to produce encoded source information;

relaying, using said gateway logic, said encoded source information from said gateway logic to a library;

decoding, using said library, said encoded source information to obtain said source information;

storing using said library, said source information as stored source information after said decoding;

intercepting, using said library, Application Programming Interface calls (API calls) and system calls, said API calls and system calls involving said source information, said API calls and system calls being related to a calling function; and returning, using said library, said stored source information to said calling function.

2. The method of claim 1 wherein said encoding is performed using a protocol that is employed to relay said email.

3. The method of claim 1 wherein said library represents a dynamic link library.

4. The method of claim 1 wherein said relaying is performed using intervening code installed on a server executing said existing email policy handling logic, said intervening code detecting calls from said existing email policy handling logic that involves said IP address of said email client and returning said IP address of said email client to said existing email policy handling logic.

5. The method of claim 1 further comprising:

establishing a first socket connection between said email client and said gateway logic;

establishing a second socket connection between said gateway logic and said existing email policy handling logic; and performing handshaking between said gateway logic and said existing email policy handling logic after said establishing said first socket and said establishing said second socket, including furnishing said IP address of said email client from said gateway logic to said existing email policy handling logic.

6. The method of claim 5 further comprising acquiring said port identifier via said first, socket connection.

7. The method of claim 1 wherein said existing email policy handling logic represents an existing email gateway.

8. The method of claim 7 wherein said existing email gateway includes an email server.

9. The method of claim 1 further comprising relaying, using said gateway logic, said port identifier of said port of said email client from said gateway logic to said existing email policy handling logic, thereby rendering said port identifier available to said existing email policy handling logic and enabling said existing email policy handling logic to perform at least a portion of said set of existing email handling policies using said port identifier.

10. The method of claim 1 wherein said encoding is performed using the Simple Mail Transfer Protocol (SMTP), the SMTP being employed to relay said email.

11. A method for implementing a first set of email handling policies in an email system that implements a set of existing email handling policies in a set of existing email gateways, said method comprising:

obtaining, using a first email gateway, source information related to an email, said email being sent by an email client, said source information including an Internet Protocol address (IP address) of said email client, said source information further including a port identifier of a port of said email client, said port of said email client being employed to send out said email;

encoding, using said first email gateway, said source information to produce encoded source information;

relaying, using said first email gateway, said encoded source information from said first email gateway to a library;

decoding, using said library, said encoded source information to obtain said source information;

storing, using said library, said source information as stored, source information after said decoding;

intercepting, using said library, Application Programming Interface calls (API Calls) and system calls, said API calls and system calls involving said source information, said API calls and system calls being related to a calling function; and returning, using said library, said stored source information to said calling function.

12. The method of claim 11 wherein said encoding is performed using a protocol that is employed to relay said email.

13. The method of claim 11 wherein said first email gateway represents software installed on another server that is different from a server on which said set of existing email gateways is installed.

14. The method of claim 11 wherein said library represents a dynamic link library.

15. The method of claim 11 wherein said relaying is performed using intervening code installed on a server executing said set of existing email gateways, said intervening code detecting calls from said set of existing email gateways that involves said IP address of said email client and returning said IP address of said email client to said set of existing email gateways.

16. The method of claim 11 further comprising:

establishing a first socket connection between said email client and said first email gateway;

establishing a second socket connection between said first email gateway and said set of existing email gateways; and performing handshaking between said first email gateway and said set of existing email gateways after said establishing said first socket and said establishing said second socket, including furnishing said IP address of said email client from said first email gateway to said set of existing email gateways.

17. The method of claim 16 further comprising acquiring said port identifier via said first socket connection.

18. The method of claim 11 wherein said set of existing email gateways represents an existing email gateway.

19. The method of claim 18 wherein said existing email gateway includes an email server.

20. The method of claim 11 further comprising relaying, using said first email gateway, said port identifier of said port of said email client from said first email gateway to said set of existing email gateways, thereby rendering said port identifier available to said set of existing email gateways and enabling said set of existing email gateways to perform at least a portion of said set of existing email handling policies using said source port identifier.

21. An email system, comprising:

an email gateway obtaining source information related to an email, said email being sent by an email client, said source-information including an internet Protocol address (IP address) of said email client, said source information further including a port identifier of a port of said email client, said port of said email client being employed to send out said email, said email gateway further encoding said source information to produce encoded source information;

a library receiving said encoded source information from said email gateway, said library further decoding said encoded source information to obtain said source information; said library further providing said source information to applications requiring said source information;

circuit hardware implementing tasks associated with said email gateway and said library; wherein said library further intercepts Application Programming Interface calls (API calls) and system calls, said API calls and system calls involving said source information, said API calls and system calls being related to a calling function, and wherein said library further returns said source information to said calling function.

22. The email system of claim 21 wherein said email gateway performs said encoding using a protocol that is employed to relay said email.

23. The email system of claim 21 wherein said library represents a dynamic link library.

* * * * *

UNITED STATES PATENT AND TRADEMARK OFFICE
CERTIFICATE OF CORRECTION

| | | |
|---|---|---|
| PATENT NO. | : 7,814,540 B1 | Page 1 of 1 |
| APPLICATION NO. | : 11/318361 | |
| DATED | : October 12, 2010 | |
| INVENTOR(S) | : En-Yi Liao, Chen-Lin Hou and Jerry Chinghsien Liao | |

It is certified that error appears in the above-identified patent and that said Letters Patent is hereby corrected as shown below:

Title Page, Item (73)

Assignee: Trend Micro Inc. (Cupertino, CA) is incorrect. Please amend the assignee to read:

Assignee: Trend Micro Inc. (Tokyo, Japan)

Signed and Sealed this
Twenty-second Day of February, 2011

David J. Kappos
*Director of the United States Patent and Trademark Office*